(12) United States Patent
Clayton

(10) Patent No.: US 12,275,172 B2
(45) Date of Patent: Apr. 15, 2025

(54) CHAIN CONTROL DEVICE WITH ELASTOMER FACE OVERMOULDED USING TWO-SHOT INJECTION MOULDING

(71) Applicant: BorgWarner, Inc., Auburn Hills, MI (US)

(72) Inventor: Philippe Alain Clayton, Camparada (IT)

(73) Assignee: BorgWarner, Inc., Auburn Hills, MI (US)

( * ) Notice: Subject to any disclaimer, the term of this patent is extended or adjusted under 35 U.S.C. 154(b) by 330 days.

(21) Appl. No.: 17/733,407

(22) Filed: Apr. 29, 2022

(65) Prior Publication Data
US 2022/0258388 A1 Aug. 18, 2022

(51) Int. Cl.
| | | |
|---|---|---|
| *B29C 45/02* | (2006.01) | |
| *B29C 45/00* | (2006.01) | |
| *B29C 45/72* | (2006.01) | |
| B29K 19/00 | (2006.01) | |
| B29K 77/00 | (2006.01) | |
| B29K 509/08 | (2006.01) | |
| B29L 31/00 | (2006.01) | |

(52) U.S. Cl.
CPC .......... *B29C 45/02* (2013.01); *B29C 45/0001* (2013.01); *B29C 45/7207* (2013.01); *B29K 2019/00* (2013.01); *B29K 2077/00* (2013.01); *B29K 2509/08* (2013.01); *B29L 2031/748* (2013.01)

(58) Field of Classification Search
None
See application file for complete search history.

(56) References Cited

U.S. PATENT DOCUMENTS

| | | | |
|---|---|---|---|
| 6,554,728 | B2 | 4/2003 | Young, Jr. et al. |
| 6,634,974 | B2 | 10/2003 | Fujiwara et al. |
| 2004/0214672 | A1 | 10/2004 | Thomas et al. |
| 2005/0266946 | A1* | 12/2005 | Thomas ............. F16H 7/18 474/111 |
| 2006/0100047 | A1 | 5/2006 | Churchill et al. |
| 2014/0256487 | A1 | 9/2014 | Ketterl et al. |
| 2020/0172783 | A1* | 6/2020 | Wei ................ C08L 91/06 |
| 2022/0280739 | A1* | 9/2022 | Leary ............ B29C 45/1704 |

FOREIGN PATENT DOCUMENTS

| | | |
|---|---|---|
| DE | 19723511 A1 | 12/1998 |
| WO | 2020114551 A1 | 6/2020 |
| WO | 2020169495 A1 | 8/2020 |

* cited by examiner

*Primary Examiner* — Mohammad M Ameen
(74) *Attorney, Agent, or Firm* — Brown & Michaels, PC

(57) ABSTRACT

A method of forming a tensioner arm bracket, chain guide, snubber or tensioner arm with two shot injection molding. The tensioner arm bracket, chain guide, snubber or tensioner arm each having a body and a chain sliding face. The body of the tensioner arm bracket, chain guide, snubber or tensioner arm bracket is formed of by a first shot of thermoplastic polymer or thermosetting resin and the chain sliding face is formed by a second shot of thermoset elastomer which is overmoulded onto the body. The body of the component is made of either a thermoplastic or thermosetting resin is fixed to its chain sliding face either by one or more of an anchor point generated by undercuts in the body and/or chemical bonds between the dissimilar materials.

7 Claims, 8 Drawing Sheets

CHAIN CONTROL DEVICE WITH ELASTOMER FACE OVERMOULDED USING TWO-SHOT INJECTION MOULDING

BACKGROUND

The present invention relates to chain control devices such as tensioner arms, guides and snubbers, and more specifically to chain control devices with an elastomer face overmoulded using two-shot injection moulding.

On many chain control devices, an elastomer is molded over, or glued onto a bracket which is cast and machined out of aluminum or another metal, but not an injection moldable resin. Using two different resin types, such as a thermoset elastomer and thermoplastic polymer is technically difficult, as moulding parameters and tool temperatures required for each of the materials is significantly different. Thermoplastic materials can withstand very high temperatures, requiring that the heat required for the melt processing must be even higher. Unlike thermosets, thermoplastic materials can be molded as often as is desired by cooling and reheating it, as long as the material is not overheated, as the thermoplastic materials because pliable at elevated temperature, with the pliability decreasing as the material cools. Overheating causes the material to decompose. Thermosets are plastics that retain their condition and shape after curing due to spatial crosslinking. Thermoset elastomers strengthen when heated, but cannot be reheated or remolded after the initial forming. Once cured, their polymers can no longer be dissolved.

During the manufacturing process, thermoplastics have the following characteristics:
  No chemical curing reaction
  High viscosity
  Difficult fiber impregnation
  Conditionally solvent resistant
  Short process times
  Unlimited shelf or storage lift
  Materials are weldable
  High energy absorption in case of damage
  Good recycling properties.

In contrast, during the manufacturing process, thermosets have the following characteristics:
  Chemical curing reaction
  Low viscosity
  Good fiber impregnation
  High solvent resistance
  Medium-to-long process times
  Limited shelf or storage life
  High fixture effort
  Brittle fracture behavior in case of damage
  Limited recycling properties.

SUMMARY

According to one embodiment of the present invention, a method of forming a tensioner arm bracket, chain guide, tensioner arm or snubber with two shot injection molding is disclosed. The tensioner arm bracket, chain guide, snubber or tensioner arm each having a body and a chain sliding face. The body of the tensioner arm bracket, chain guide, snubber or tensioner arm bracket is formed of by a first shot of thermoplastic polymer or thermosetting resin and the chain sliding face is formed by a second shot of thermoset elastomer which is overmoulded onto the body. The thermoplastic polymer or thermosetting resin and the thermoset elastomer form a molecular bond which connects the chain sliding face to the body.

DETAILED DESCRIPTION

Figure 5:
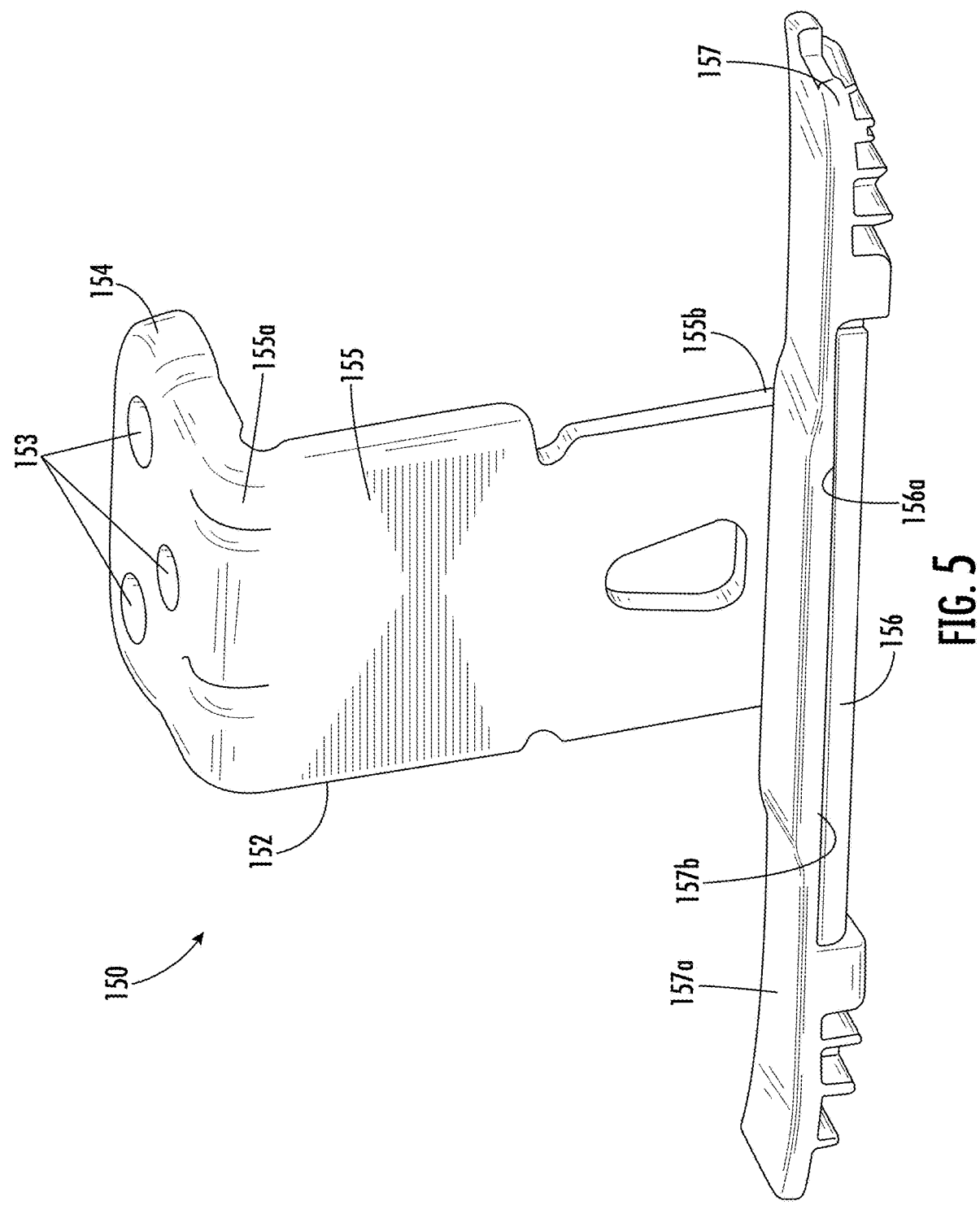
FIG. 5 shows a snubber with a bracket and a face, in which the face and the bracket are made of two different resins.
Figure 6:
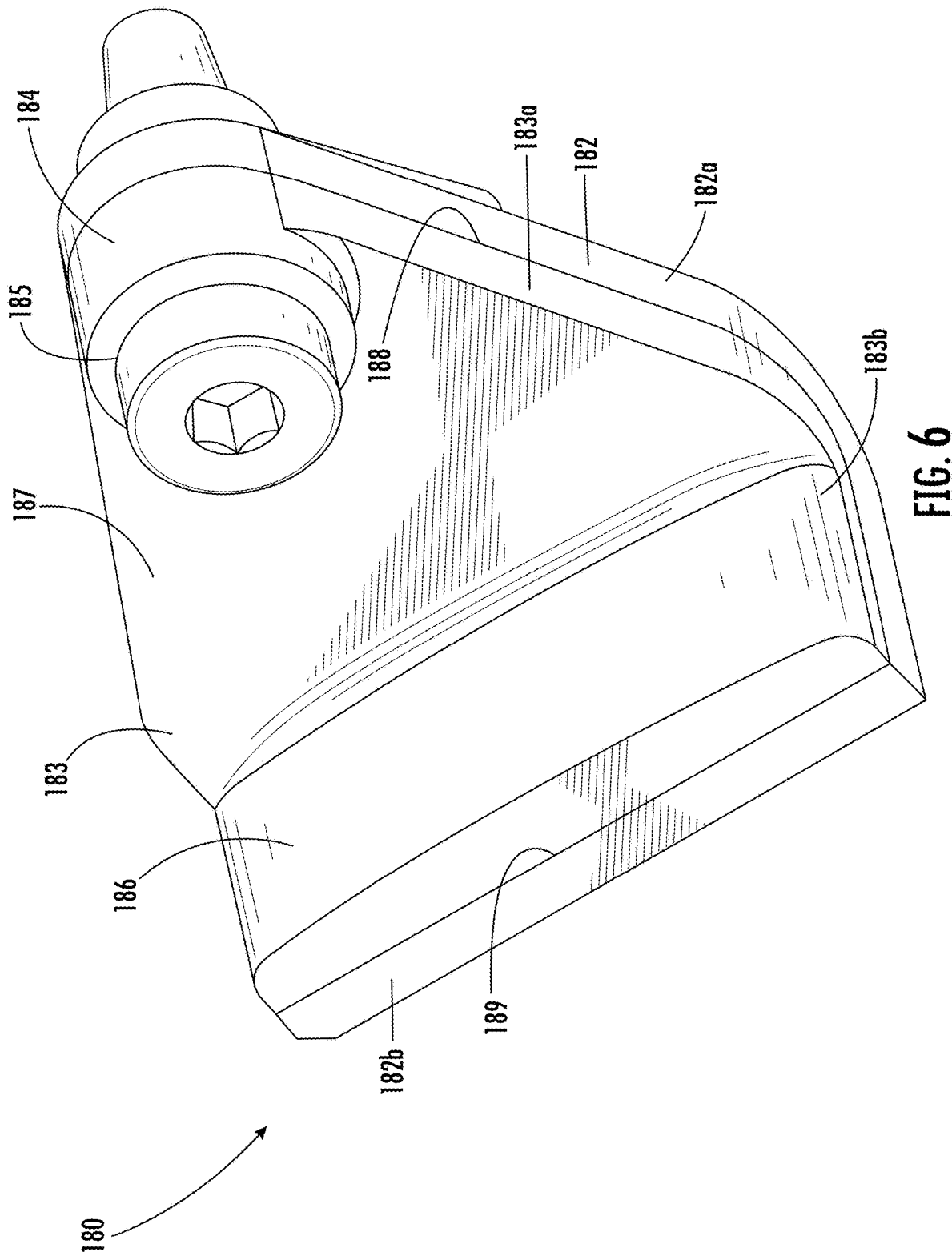
FIG. 6 shows another snubber with a bracket and a face, in which the face and the bracket are made of two different resins.

FIGS. 1-4 and 7 illustrate a shoe according to an exemplary embodiment of the present invention and an example of the application thereof. An example will be described here in which the shoe is used on a chain tensioner arm disposed on a slack-side span of a chain, but the shoe according to this exemplary embodiment may equally be used in the same way on a chain guide disposed on a tension-side span of a chain (although this is not shown in the drawings). FIG. 5-6 illustrates a snubber with a shoe. Similar to the chain tensioner arm, the snubber and associated shoe can be used on a tension-side span of a chan. The tensioner arms, tensioner bracket arms, snubbers, and chain guides of the present invention all include a body formed by a first thermoplastic and a chain sliding surface for interaction with the chain formed by a thermoset elastomer.

Figure 1:
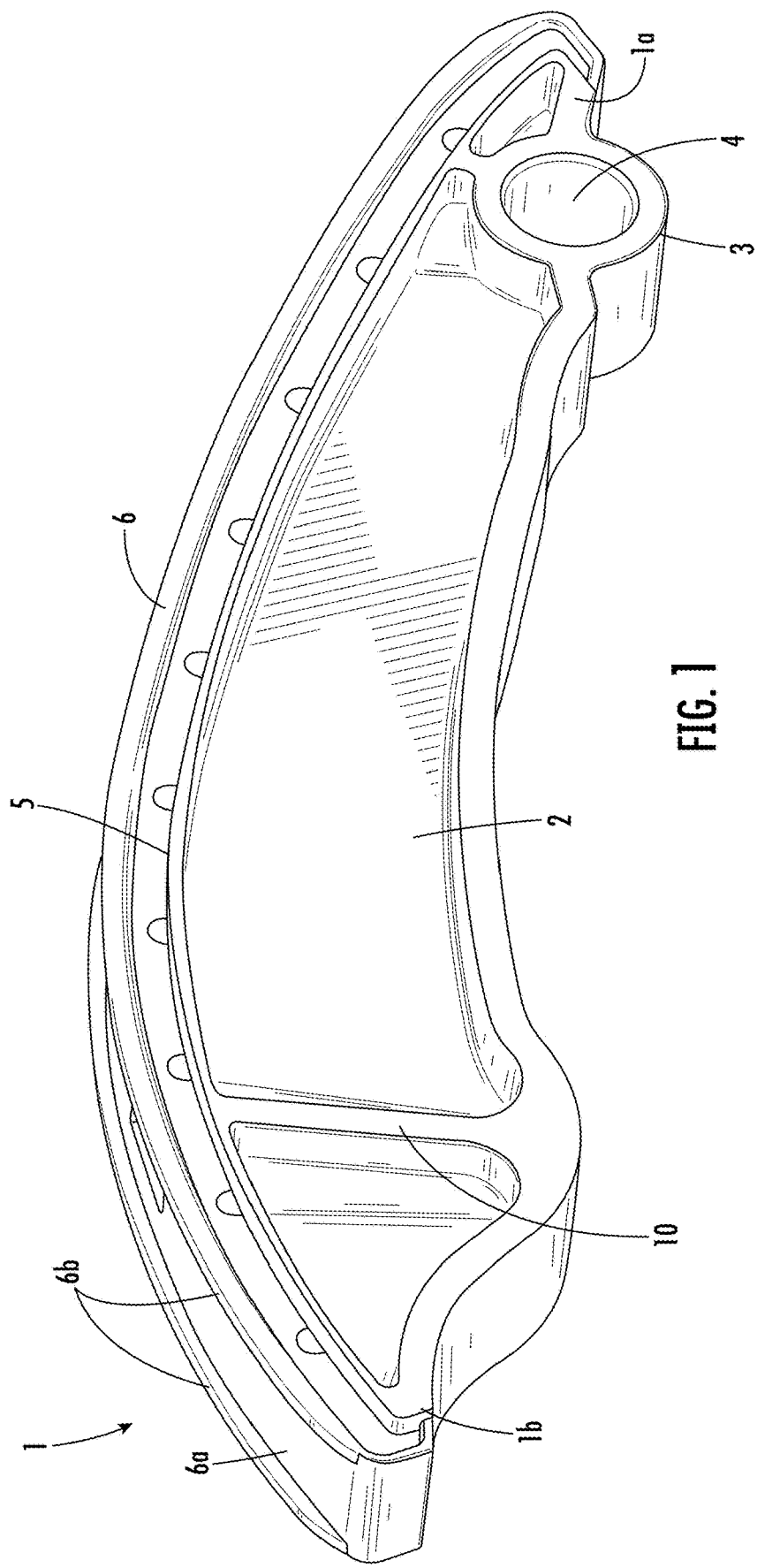
FIG. 1 shows a dovetail fixed tensioner arm of a face and bracket in which the face and the bracket are made of two different resins.

As shown in FIG. 1, a chain tensioner arm 1 includes a tensioner arm bracket body 2 having a first end 1a and a second end 1b. At the first end 1a is a boss part 3 and a pivot hole 4 formed passing therethrough. The tensioner arm bracket body 2 has an upper surface 5 which curves in the shape of an arc. Extending across the tensioner arm bracket body 2 from the first end 1a to the second end 1b and covering at least the upper surface 5 is a shoe 6 which is formed on the tensioner arm bracket body 2 by two shot injection molding. The shoe 6 has a chain sliding face 6a for slidably receiving a chain between two shoe walls 6b.

Figure 2:
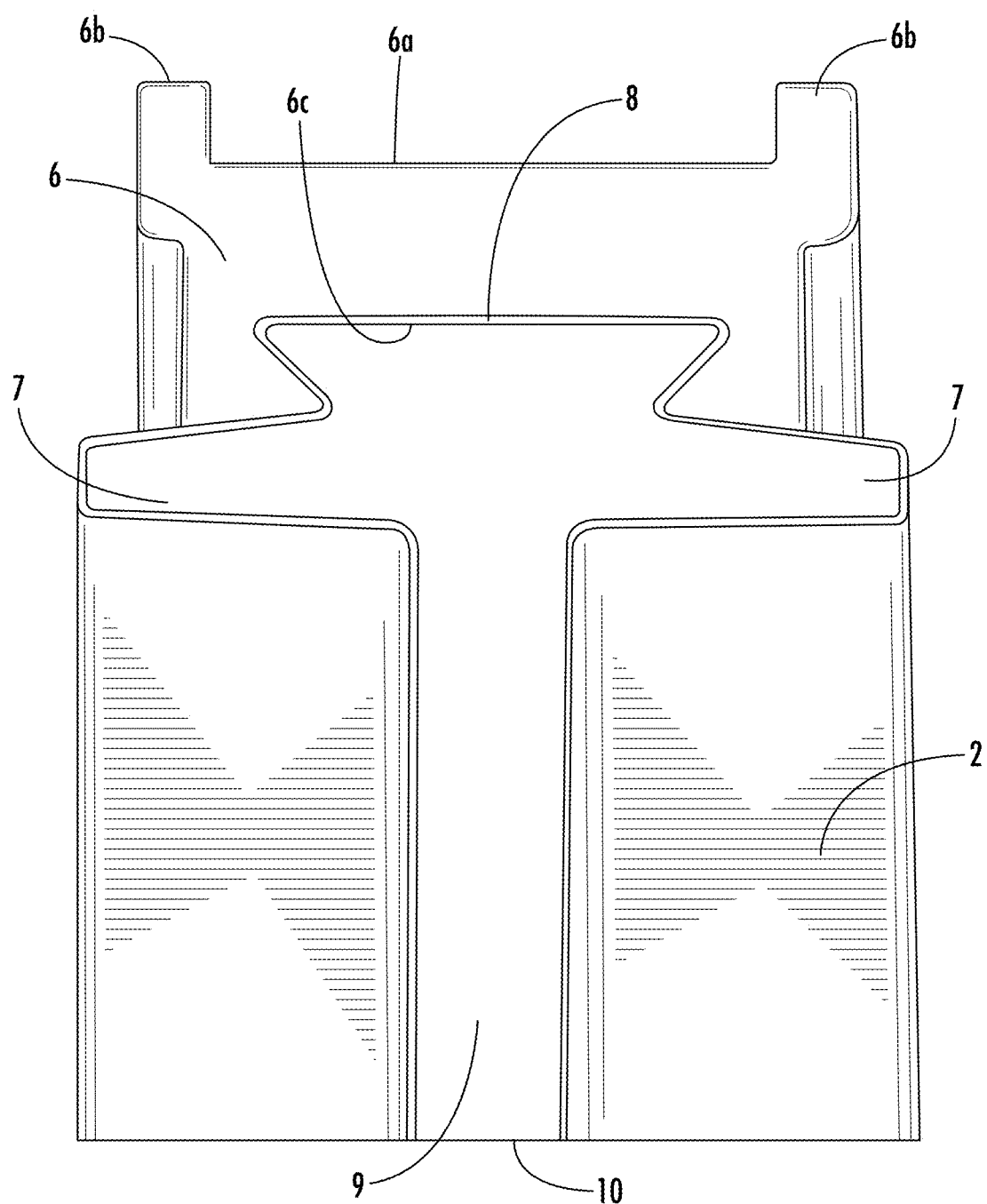
FIG. 2 shows a sectional view of FIG. 1.

FIG. 2 shows a sectional view of chain tensioner arm 1 along at least one rib 10 of the tensioner arm bracket body 2. The tensioner arm bracket body 2 has a generally "T-shaped" section with a horizontal portion 7 and a vertical portion 9, with the horizontal portion 7 of the "T-shaped" section including a raised trapezoid forming a pin 8.

The shoe 6 has a chain sliding face 6a which contacts the chain and a tensioner arm face 6c which contacts the upper surface 5 of the tensioner arm bracket body 2. In this embodiment, the tensioner arm face 6c of the shoe 6 is shaped to define a pin socket 6c which receives the pin 8, forming a dovetail joint. The shoe 3 preferably ends over the first end 1a and the second end 1b of the tensioner arm bracket body 2.

The tensioner arm bracket body 2 is formed of thermoplastic or thermosetting resin, with or without glass fibers. Examples of the base materials can include, but is not limited to, polyamide 6 (PA6), polyamide 66 (PA66) or polyamide 46 (PA46). The shoe 6 is preferably overmoulded onto the tensioner arm bracket body 2. An example of the material of the shoe 6 is Hydrogenated Acrylonitrile-Butadiene Rubber (HNBR). In another embodiment, metallic inserts or other rigid materials can be insert molded or otherwise fixed into the tensioner arm bracket body 2. For example, bushings or spacers can be insert molded to support the axial load of fixing screws to mount the tensioner arm 1 via the pivot hole 4 within the engine. Therefore, the tensioner arm 1 has a shoe 6 of a thermoset elastomer overmoulded onto a tensioner arm bracket body 2 formed of a thermoplastic polymer. The thermoset elastomer and the thermoplastic polymer form a molecular bond via the two-shot injection process which is described below in FIG. 8.

Figure 3:
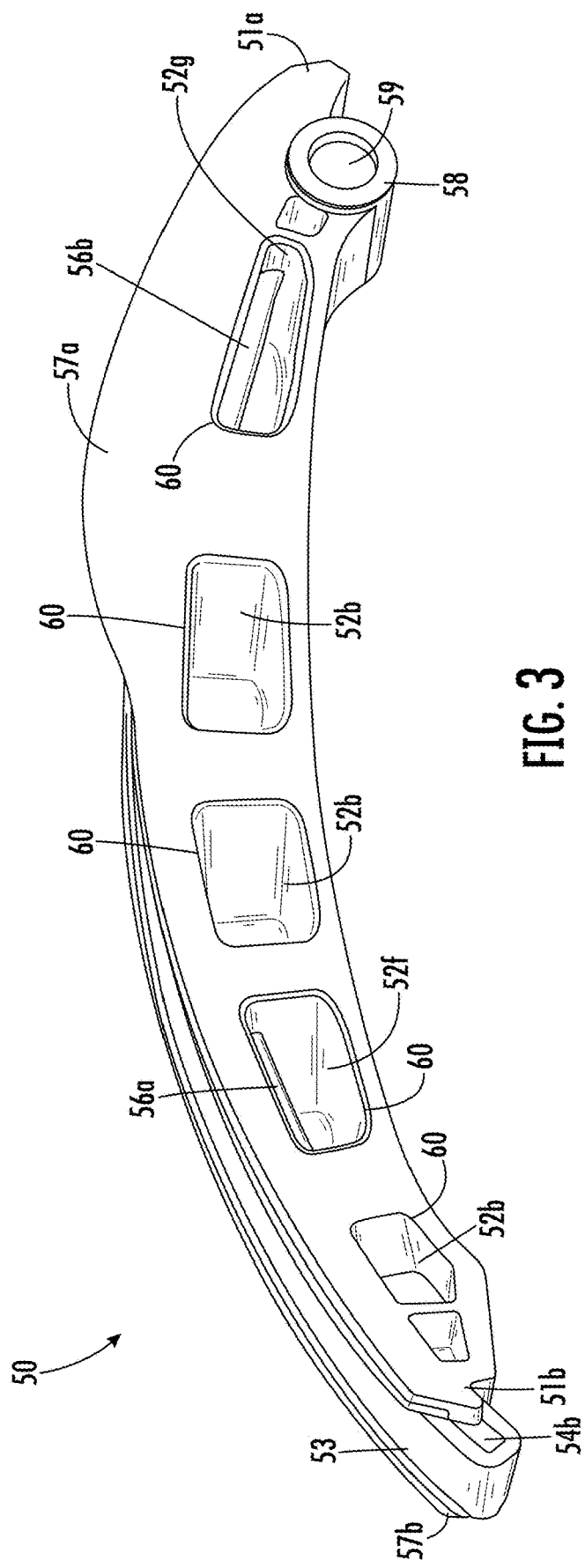
FIG. 3 shows a tensioner arm with an anchored face in which the face and the bracket of the tensioner arm are made of two different resins.
Figure 4:
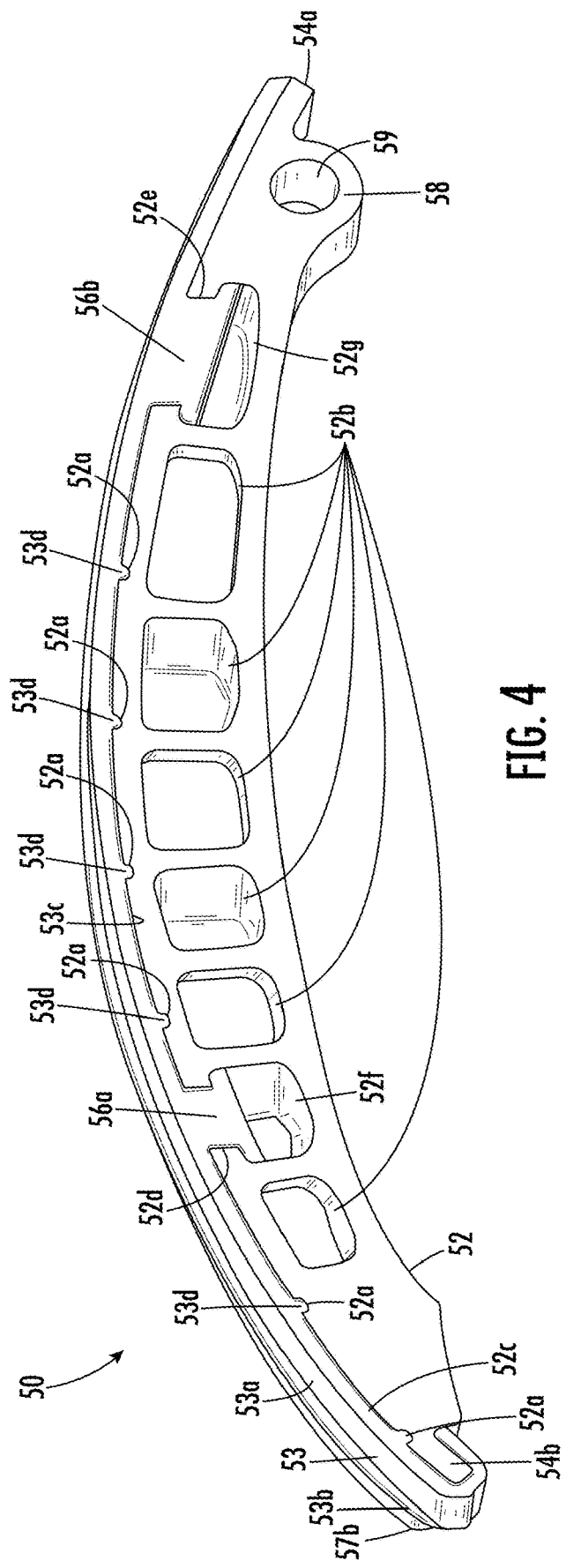
FIG. 4 shows a sectional view of FIG. 3.

FIGS. 3-4 show a tensioner arm with an anchored face in which the face and the bracket body of the tensioner arm are made of two different resins.

A chain tensioner arm 50 includes a tensioner arm bracket body 52 with a first end 54a and a second end 54b. At the first end 54a is a boss part 58 and a pivot hole 59 formed passing therethrough. Between the first end 54a and the second end 54b of the tensioner arm bracket body 52 are a series of radial holes 52b, 52f, 52g which pass through the tensioner arm bracket body 52. The tensioner arm bracket body 52 has an upper surface 52c which is arc shaped.

Along the upper surface 52c is a first slot 52d and a second slot 52e extending from the upper surface 52c and through a portion of the tensioner arm bracket body 52 to connect to radial holes 52f, 52g. Additional holes 52a can also be present along the upper surface 52c.

On either side of the tensioner arm bracket body 52 and the shoe 53 are side plates 57a, 57b. The side plates 57a, 57b can aid in guiding or centering the chain down a center of the chain sliding face 53a of the shoe 53. The side plates 57a, 57b can have a series of holes 60 which correspond to the series of radial holes 52b, 52f, 52g which pass through the tensioner arm bracket body 52.

Extending across the tensioner arm bracket body 52 from the first end 54a to the second end 54b and covering at least the upper surface 52c is a shoe 53 which is formed on the tensioner arm bracket 2 by two shot injection molding. The shoe 53 has a chain sliding face 53a for slidably receiving a chain between two shoe walls 53b. Opposite the chain sliding face 53a is a tensioner arm face 53c which contacts the upper surface 52c of the tensioner arm bracket body 52. Extending from the tensioner arm face 53c are at least two protrusions 56a, 56b which are aligned with slots 52d, 52e, such that the protrusions 56a, 56b extend beyond the slots 52d, 52e and into the radial holes 52f, 56g, securing the shoe 53 to the tensioner arm bracket body 52 via two shot injection molding. The shoe 53 is present between side plates 57a, 57b which are preferably attached after the two shot injection molding process.

The placement of the first slot 52d and the second slot 52e can vary from the positions shown. Furthermore, the tensioner arm face 53c can also include a plurality of smaller protrusions 53d which are received within holes 52a along the upper surface 52c of the tensioner arm bracket body 52.

The number of slots 52e, 52f and the holes 52a within the upper surface 52c of the tensioner arm bracket body 52 can vary.

The tensioner arm bracket body 52 is formed of thermoplastic or thermosetting resin, with or without glass fibers. Examples of the base materials can include, but is not limited to, polyamide 6 (PA6), polyamide 66 (PA66) or polyamide 46 (PA46). The shoe 53 is preferably overmoulded onto the tensioner arm bracket 52. An example of the material of the shoe 53 is Hydrogenated Acrylonitrile-Butadiene Rubber (HNBR). In another embodiment, metallic inserts or other rigid materials can be insert molded or otherwise fixed into the tensioner arm bracket body 52. For example, bushings or spacers can be insert molded to support the axial load of fixing screws to mount the tensioner arm 50 within the engine. Therefore, the tensioner arm bracket body 52 has a shoe 53 of a thermoset elastomer overmoulded onto a tensioner arm bracket body 52 formed of a thermoplastic polymer. The thermoset elastomer and the thermoplastic polymer can form a molecular bond via the two shot injection process.

FIG. 5 shows a snubber with a bracket body and a face, in which the face and the bracket body are made of two different resins.

The snubber 150 includes a bracket body 152 with a first portion 154, a second portion 155, and a third portion 156. The first portion 154 has a plane that is perpendicular to and connected to a first end 155a of the second portion 155. The third portion 156 has a plane that is perpendicular to and connected to a second end 155b of the second portion 155. The first portion 154 and the third portion 156 extending laterally from the second portion 155 in opposite directions. Mounting holes 153 are present in the first portion 154 for attaching the bracket body 152 within the engine. The third portion 156 has a face surface 156a in which the face or guide 157 is attached to. The face 157 has a chain sliding surface 157a and a second surface 157b which directly contacts the face surface 156a of the third portion 156 of the bracket body 152. The face 157 preferably surrounds at least a portion of the third portion 156 of the bracket body 152.

The bracket body 152 of the snubber 150 is formed of thermoplastic or thermosetting resin, with or without glass fibers. Examples of the base materials can include, but is not limited to polyamide 6 (PA6), polyamide 66 (PA66) or polyamide 46 (PA46). The shoe 157 is preferably overmoulded onto the bracket body 152. An example of the material of the face is Hydrogenated Acrylonitrile-Butadiene Rubber (HNBR). In another embodiment, metallic inserts or other rigid materials can be insert molded or otherwise fixed into the bracket body 152. Therefore, the snubber 150 has a face 157 of a thermoset elastomer overmoulded onto a bracket body 152 formed of a thermoplastic polymer. The thermoset elastomer and the thermoplastic polymer form a molecular bond via the two shot injection process.

FIG. 6 shows another snubber with a bracket and a face, in which the face and the bracket are made of two different resins.

The snubber 180 includes a bracket body 182 and a face 183. The bracket body 182 is preferably L-shaped with a vertical portion 182a and a horizontal portion 182b. The vertical portion 182a of the L-shaped bracket 182 has a pivot hole (not shown) formed passing therethrough.

The face 183 of the snubber 180 is also L-shaped with a vertical portion 183a and a horizontal portion 183b. Within the vertical portion 183a of the face 183 is a corresponding boss part 184 with a pivot hole 185 passing therethrough.

The pivot hole 185 in the face 183 is aligned with the pivot hole in the bracket body 182. The vertical portion 183a of the face 183 has a chaining sliding surface 186. The vertical portion 183a and the horizontal portion 183b of the face 183 has a first surface 187 and a second surface 188. The second surface 188 of the vertical portion 183a of the face 183, opposite the chain sliding face 186, is adjacent a first surface 189 the vertical portion 182a of the bracket body 182. The second surface 188 of the horizontal portion 183b of the face 183 is adjacent the horizontal portion 183b of the bracket body 182.

The bracket body 182 is formed of thermoplastic or thermosetting resin, with or without glass fibers. Examples of the base materials can include, but is not limited to polyamide 6 (PA6), polyamide 66 (PA66) or polyamide 46 (PA46). The face 183 is preferably overmoulded onto the bracket body 182. An example of the material of the face is Hydrogenated Acrylonitrile-Butadiene Rubber (HNBR). In another embodiment, metallic inserts or other rigid materials can be insert molded or otherwise fixed into the bracket body 182. For example, bushings or spacers can be insert molded to support the axial load of fixing screws to mount the snubber 180 within the engine. Therefore, the snubber 180 has a face 183 of a thermoset elastomer overmoulded onto a bracket body 182 formed of a thermoplastic polymer. The thermoset elastomer and the thermoplastic polymer form a molecular bond via the two shot injection process.

Figure 7:
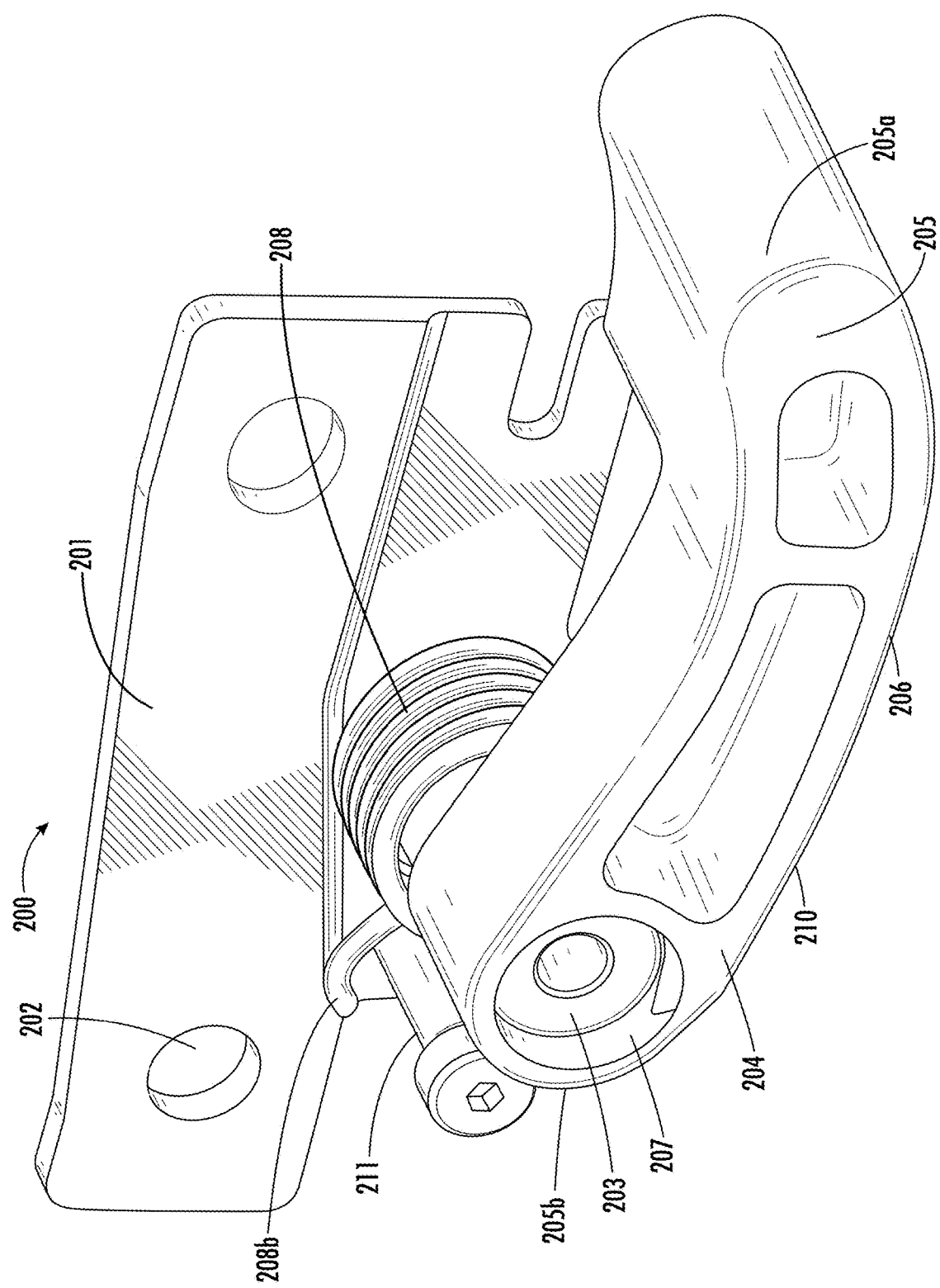
FIG. 7 shows a mechanical tensioner with a bracket and a tensioner arm having a face in which the tensioner arm and the face are made of two different resins.

FIG. 7 shows a mechanical tensioner with a bracket and a tensioner arm having a face in which the tensioner arm and the face are made of two different resins.

A mounting bracket 201 has holes 202 for mounting the mechanical tensioner 200 within the engine. A pivot axle 203 and a spring stop 211 extends perpendicular from the mounting bracket 201. The pivot axle 203 receives an arm 204. The arm 204 preferably has a single piece body 205, but can be manufactured from multiple pieces. The body 205 of the arm 204 has a first end 205a, a second end 205b, and a chain sliding surface 206 which interacts with a chain. An elastomer 210 is present on the chain sliding surface 206 of the arm 204. At the second end 205b of the body 205 is a hole 207 for receiving the pivot axle 203. A torsion spring 208 is present between the mounting bracket 201 and acts upon the second end 205 of the arm 204 on the pivot axle 203. One end (not shown) of the spring 208 is grounded relative to the mounting bracket 201 and the second end 208b contacts the spring stop 211. In this embodiment, the tensioner arm and the elastomer face 210 of the chain sliding surface 206 are formed by two shot injection molding.

The body 205 of the tensioner arm 204 is formed of thermoplastic or thermosetting resin, with or without glass fibers. Examples of the base materials can include, but is not limited to polyamide 6 (PA6), polyamide 66 (PA66) or polyamide 46 (PA46). The elastomer face 210 is preferably overmoulded onto the body 205 of the tensioner arm 204. An example of the material of the face is Hydrogenated Acrylonitrile-Butadiene Rubber (HNBR). In another embodiment, metallic inserts or other rigid materials can be insert molded or otherwise fixed into the body 205 of the tensioner arm 204. For example, bushings or spacers can be insert molded to support the axial load of fixing screws to mount the body 205 of the tensioner arm 204 within the engine. Therefore, the body 205 of the tensioner arm 204 has an elastomer face 210 of a thermoset elastomer overmoulded onto the body 205 of the tensioner arm 204 formed of a thermoplastic polymer. The thermoset elastomer and the thermoplastic polymer form a molecular bond via the two shot injection process.

Figure 8:
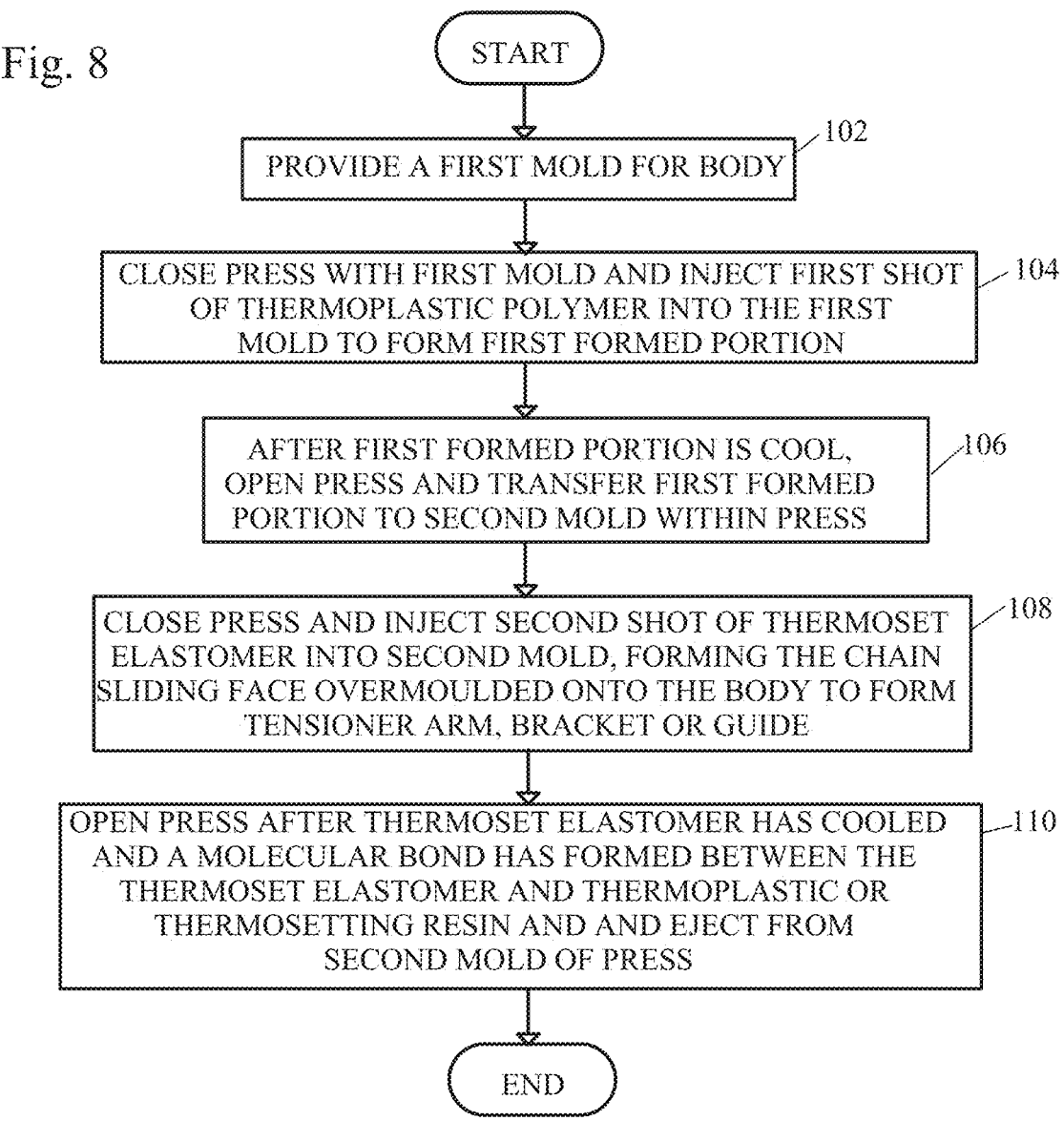
FIG. 8 shows a method of forming a tensioner arm bracket with two shot injection moulding

FIG. 8 shows a method of forming a tensioner arm bracket, guide, or tensioner arm with two shot injection moulding. The tensioner arm bracket, guide or tensioner arm each include a body and a chain sliding surface for interaction with the chain.

The chain tensioner arm, guide or tensioner bracket is formed by two shot injection. In a first step, a press with a first mold is provided to form a first formed portion (step 102). The first formed portion is the body of the tensioner arm, bracket or guide.

In a second step, the press is closed and a first shot of thermoplastic polymer or thermosetting resin is injected into the first mold to form a first formed portion of the body of the tensioner arm, tensioner bracket or guide (step 104).

After the first formed portion has cooled, the press is opened and the first formed portion is transferred to a second mold within the press (step 106).

Next, the press is closed and a second shot of thermoset elastomer is injected into the second mold, to overmould in, through or around the tensioner arm, guide or tensioner bracket to form the chain sliding face of the tensioner arm, tensioner bracket or guide (step 108).

The press is opened after the thermoset elastomer has cooled and a molecular bond has formed between the thermoset elastomer of the second shot and the thermoplastic or thermosetting resin of the first shot and the completed chain tensioner arm, guide or tensioner arm is ejected from the press (step 110) and the method ends.

Between the first step (step 102) and the second step (step 104), metallic inserts or other rigid materials can be insert molded or otherwise fixed into the tensioner bracket, guide or tensioner arm by placing the inserts into the first mold of the press.

The thermoplastic or resin can include glass fibers. The thermoplastic or resin is typically polyamide 6 (PA6), polyamide 66 (PA66) or polyamide 46 (PA46) or other suitable engineering polymer. The thermosetting resin is Hydrogenated Acrylonitrile-Butadiene Rubber (HNBR) or any other suitable elastomer.

Examples of two-shot mold structures which can be used are not limited to: a rotary platen, a core toggle two-shot mold, or an index plate two-shot mold.

The benefits of two shot injection molding are as follows: a decrease in the number of components in the finished assembly; an increase in efficiency due to the multiple components molded with a single tool and eliminating the need to weld or join components; increase in quality due to a decrease in tolerances, high level accuracy and repeatability with a decrease in snaps; very robust joints between dissimilar materials, due to the possibility of liquid polymers being able to flow into undercuts so as to form multiple anchor points, and complex molding which can incorporate multiple materials for functionality that are not otherwise achievable.

Alternatively, single two-shot injection moulding can be used to form a tensioner arm bracket, guide, or tensioner arm, receiving a first injection of thermoplastic or resin, with the mould being transferred to a second tool which applies a second injection of HNBR or another elastomer.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of forming a tensioner arm bracket, chain guide, snubber or tensioner arm, each comprising a body and a chain sliding surface for contacting a chain, the method comprising:

providing a press with a first mold to form the body of the tensioner arm bracket, chain guide, snubber or tensioner arm;

closing the press and injecting a first shot of thermoplastic or thermosetting resin into the first mold to form a first formed portion;

opening the press after the first formed portion of the thermoplastic or thermosetting resin of the body of the tensioner arm bracket, chain guide, snubber or tensioner arm has cooled and transferring the first formed portion to a second mold within the press;

closing the press and injecting a second shot of thermoset elastomer into the second mold, forming the chain sliding surface overmoulded onto the body of the tensioner arm bracket, chain guide, snubber or tensioner arm to form the tensioner arm bracket, the chain guide, snubber or the tensioner arm; and opening the press after the thermoset elastomer has cooled and a molecular bond has formed between the thermoset elastomer of the second shot and the thermoplastic or thermosetting resin of the first shot, and ejecting the tensioner arm bracket, chain guide, snubber or tensioner arm from the second mold.

2. The method of claim 1, wherein after providing the press with the first mold to form the body of the tensioner arm bracket, chain guide, snubber or tensioner arm, further comprising placing inserts into the first mold to form a boss to support axial loading of the tensioner arm bracket, the chain guide, snubber or the tensioner arm.

3. The method of claim 1, wherein the thermoplastic or thermosetting resin includes glass fibers.

4. The method of claim 1, wherein the thermoplastic or thermosetting resin is selected from a group consisting of: polyamide 6, polyamide 66 and polyamide 46.

5. The method of claim 1, wherein the thermoset elastomer is hydrogenated acrylonitrile-butadiene rubber.

6. The method of claim 1, wherein the thermoplastic elastomer injected into the second mold is received within slots formed in the body.

7. The method of claim 1, wherein the thermoplastic elastomer injected into the second mold is molded over the body formed by thermoplastic or thermosetting resin.

* * * * *